Patented July 4, 1933

1,916,421

UNITED STATES PATENT OFFICE

EARDLEY HAZELL, OF NEW YORK, N. Y., ASSIGNOR TO THE NAUGATUCK CHEMICAL COMPANY, OF NAUGATUCK, CONNECTICUT, A CORPORATION OF CONNECTICUT

RUBBER CEMENT

No Drawing. Application filed July 25, 1930. Serial No. 470,773.

This invention relates to the production of low viscosity cements, more particularly low viscosity rubber cements wherein an organic solvent is used as a carrier agent for the rubber.

It is well known that organic liquids which "dissolve" rubber become highly viscous even when relatively small amounts of rubber are "dissolved" therein. This is due to the tendency of the rubber to readily swell or gel in such solvents. Heretofore various means have been tried to reduce the viscosity and increase the rubber content. Among these are prolonged mastication of the rubber prior to making a solution, heating the cement, or adding acids, bases or salts which react chemically with the rubber. Prolonged mastication is costly and injures the physical properties of the rubber. Heating the cement requires much equipment and since the common rubber solvents are inflammable is a precarious procedure. The other expedients give negligible effects. The practice of this invention avoids these disadvantages and in general gives more desirable results.

An object of this invention is to provide a rubber cement having a marked reduction in viscosity and increased concentration of rubber. Another object is to provide a low viscosity cement of fine texture (smoothness) and reduced "snap-back" (elasticity). Another object is to provide a cement which will allow a maximum amount of rubber compound to be applied to an article with a minimum number of applications. A further object is to provide a rubber cement which, when applied to porous materials such as fabrics, will have increased penetrating power, better spreading properties and improved adhesive properties. A still further object is to provide a process of making such rubber cements which will allow of economy of time and cost together with added safety of operation over ordinary processes of making rubber cements. Other objects will be apparent from the description which follows.

According to the invention a "desolvating" agent for rubber is employed in the process in conjunction with a rubber solvent. By "desolvating" agents are meant those organic liquids which are polar compounds, that is, compounds containing chemically reactive groups, and have little if any swelling or dissolving action on crude rubber, for example, such a liquid which when a piece of crude rubber is immersed in it will be imbibed by the rubber to an extent not substantially in excess of about 150% of the weight of the rubber. These "desolvating" agents are substantially non-solvents of rubber but are soluble in rubber solvents. Hence they reduce the swelling action of the rubber solvent on the rubber in the cement and eliminate in part the gel formation which is the chief cause of high viscosity. General examples of these materials include lower aldehydes, lower ketones, lower alcohols, lower esters, lower fatty acids, primary aromatic amines, aromatic nitro-compounds, diesters of dicarboxylic acids, chlorhydrins and nitriles. More specific examples are:

| Aldehydes | Ketones | Ethers |
|---|---|---|
| Formaldehyde to n-butyraldehyde and Salicyl aldehyde  Paraldehyde Aldol | Acetone Methyl ethyl ketone Aceto phenone Mesityl oxide | Methylol |

| Esters | Alcohols | Phenols |
|---|---|---|
| Methyl acetate Propyl acetate Isopropyl acetate Phenyl acetate Ethyl aceto acetate Mono acetin Triacetin | Methyl alcohol to nonyl alcohol. Diacetone alcohol Allyl alcohol. Cyclohexanol | Phenol Cresol |

| Aromatic amines | Other substances |
|---|---|
| Methyl aniline Ethyl aniline O-Toluidine O-Xylidine | Pyridine Acetonitrile Acetic acid Nitro benzene Ethylene chlorhydrin Ricinoleic acid Oleic acid |

It is preferred to use ethyl alcohol, denatured alcohol or acetone. The agents are used desirably in quantities short of that which will precipitate or throw down the rubber from the final "solution".

More specifically the invention comprises mixing a suitable quantity of the "desolvating" agent with a plasticized batch of crude rubber, or plasticized rubber compound which already contains such as compounding agents, pigments or curatives. The batch may be mixed in any suitable apparatus such as a W & P mixer, internal mixer with a reflux condenser, or even on an ordinary rubber mill. The rubber before being mixed with the "desolvating" agent may be heat treated, if desired, to soften it, for example, heating the rubber in an autoclave by admitting air to about 10 lbs. per square inch of air pressure followed by steam of 30 to 40 lbs. per sq. inch steam pressure. The duration of the treatment is about 45 minutes including a 15 minute rise to about 275° F. which is the temperature maintained. The "desolvating" agent is preferably added slowly while mixing on the mixing apparatus. To expedite the mixing, to aid in lowering the viscosity and also to help maintain the rubber as a suspension in the final product, there may also be added to the rubber a small amount of a soap which is soluble in organic solvents, for instance such as zinc or lead oleate or laurate, triethanolamine oleate or their equivalents. The mixing or milling may be continuous or intermittent, but should not be so drastic as to injure the physical properties of the rubber. The mixing is continued until the dough formed reaches a condition whereby it will readily disperse in a rubber solvent, e. g. by stirring it in a little solvent for a few minutes. The desired rubber solvent is now added to the dough or putty-like mass, mixing meanwhile, until the desired consistency is reached.

The following example is illustrative of the invention but is not to be construed as limiting thereof.

A rubber cement compound having the composition

| | Parts by weight |
|---|---|
| Rubber | 100 |
| Sulfur | 1.75 |
| Organic accelerator (mixture of approximately equal parts of triethyl trimethylene triamine with stearic acid) | 7.0 |
| Cumar resin | 7.0 |
| Zinc oxide | 16.0 |
| Carbon black | 2.0 | is made on the mill. It is then transferred to a W & P mixer and masticated in the cold with ethyl alcohol running in on the batch meanwhile in a fine stream. The alcohol is added as fast as is consistent with good mixing. It is noticed that practically no heat is generated while incorporating the alcohol. It is further noticed that the dough, although very soft, does not adhere to the machine. The mastication and addition of alcohol are continued until the dough can be dispersed readily by rubbing a small piece of it adhering to the end of a stirring rod against the inside of a beaker containing gasoline naphtha. The above mixing requires about 1¾ hours, after which solvent (68° naphtha) is allowed to run in slowly on the dough in place of alcohol, the masticating being continued until the dough has attained such consistency that it flows freely and spreads smoothly. The addition of solvent requires about a half hour. The quantities involved are After addition of alcohol_ 92.1% total solids
% alcohol _____ 7.9%
After addition of solvent_ 60.6% total solids The total time required to make this cement is about 3½ hours. In practice heretofore the cement stock consumes around 3 hours on the mill and is then churned 8 hours with solvent.

By means of this invention a reduction in viscosity is attained which allows increasing the rubber content to provide a cement comparable with the ordinary cement in viscosity but having an increased rubber content. The low viscosity cements when applied to fabrics or other porous materials have higher penetrative powers than ordinary cements having the same solid content. Also by reason of containing a higher rubber content and having no increased viscosity the cement may be applied a less number of times in order to deposit a desired quantity of rubber and with a corresponding saving in the solvent employed.

A rubber cement as prepared herein may be employed as a dipping cement for the making of formed rubber articles such as gloves and the like, by dipping the form in the rubber cement, or depositing the rubber upon the form while immersed in a water dispersion of the cement prepared with the aid of a protective colloid, such deposition being according to well known practices, for instance electro deposition, and afterwards withdrawing and drying to remove volatile solvent. A rubber cement prepared according to this invention allows increasing the concentration of total solids about 100%, without increasing the viscosity over that of a cement not so prepared, requires the use of less solvent and deposits a larger amount of rubber with few dippings. Reduction in the amount of solvent reduces the tendency of the article to blister during the drying of the same. Also a smaller number of dippings requires a shorter exposure of the article form in the dipping room, thereby reducing the "dipping hazard" because there is less opportunity for particles of foreign matter to become lodged on the deposited layer.

With the detailed disclosure above given, it is obvious that modifications will suggest themselves, for instance other rubber solvents may be used in place of that given in the example, also various compounding or filling substances, and accelerators, such as are employed with the ordinary cements—without departing from the principle of invention, and it is not desired to limit the invention otherwise than as set forth in the appended claims.

Having thus described my invention, what I claim and desire to protect by Letters Patent is:

1. A low viscosity substantially non-aqueous cement containing rubber in a state of colloidal solution in a medium including a "desolvating" agent, a soap which is soluble in organic solvents, and a substantial proportion of a rubber solvent, the said "desolvating" agent constituting a substantial proportion of the liquid medium of the cement.

2. A low viscosity cement containing pre-softened rubber in a state of colloidal solution in a medium including a "desolvating" agent, a soap which is soluble in organic solvents, and a substantial proportion of a rubber solvent, the said "desolvating" agent constituting a substantial proportion of the liquid medium of the cement, said cement containing in excess of 50% total solids.

3. A low viscosity substantially non-aqueous cement containing pre-softened rubber in a state of colloidal solution in a medium including a "desolvating" agent, a soap which is soluble in organic solvents, and a substantial proportion of a rubber solvent, the said "desolvating" agent constituting a substantial proportion of the liquid medium of the cement.

4. A process of preparing a low viscosity cement which comprises plasticizing rubber, adding thereto with mixing a "desolvating" agent and then adding with mixing a rubber solvent to the plastic mass.

5. A process of preparing a low viscosity cement which comprises plasticizing rubber, adding thereto with mixing a "desolvating" agent and a soap which is soluble in organic solvents and then adding with mixing a rubber solvent to the plastic mass.

6. A process of preparing a low viscosity cement which comprises heat-softening rubber, plasticizing the rubber, adding thereto with mixing a "desolvating" agent and then adding with mixing a rubber solvent to the plastic mass.

7. A low viscosity cement containing pre-softened rubber in a state of colloidal solution in a medium including an alcoholic "desolvating" agent, a soap which is soluble in organic solvents, and a substantial proportion of a rubber solvent, the said "desolvating" agent constituting a substantial proportion of the liquid medium of the cement.

8. A low viscosity substantially non-aqueous cement containing pre-softened rubber in a state of colloidal solution in a medium including an alcoholic "desolvating" agent, a soap which is soluble in organic solvents, and a substantial proportion of a rubber solvent, the said "desolvating" agent constituting a substantial proportion of the liquid medium of the cement.

9. A low viscosity cement containing pre-softened rubber in a state of colloidal solution in a medium including ethyl alcohol, a soap which is soluble in organic solvents, and a substantial proportion of naphtha, the amount of ethyl alcohol constituting a substantial proportion of the liquid medium of the cement.

10. A low viscosity substantially non-aqueous cement containing pre-softened rubber in a state of colloidal solution in a medium including ethyl alcohol, a soap which is soluble in organic solvents, and a substantial proportion of naphtha, the amount of ethyl alcohol constituting a substantial proportion of the liquid medium of the cement.

11. A process of preparing a low viscosity cement which comprises heat-softening rubber, plasticizing the rubber, adding thereto with mixing a "desolvating" agent and a soap which is soluble in organic solvents and then adding with mixing a rubber solvent to the plastic mass.

12. A process of preparing a low viscosity cement which comprises heat-softening rubber, plasticizing the rubber, adding thereto with mixing an alcoholic "desolvating" agent and then adding with mixing a rubber solvent to the plastic mass.

13. A process of preparing a low viscosity cement which comprises heat-softening rubber, plasticizing the rubber, adding thereto with mixing an alcoholic "desolvating" agent and then adding with mixing naphtha to the plastic mass.

14. A process of preparing a low viscosity cement which comprises plasticizing rubber and adding thereto with mixing a "desolvating" agent and a rubber solvent.

15. A low viscosity cement containing pre-softened rubber in a state of colloidal solution in a medium including a "desolvating" agent and a substantial proportion of a rubber solvent, said cement containing in excess of 50% rubber.

16. A low viscosity rubber cement containing ethyl alcohol, the rubber thereof being in a substantially normal state of aggregation and in solution in a substantial proportion of naphtha, said cement containing in excess of 50% rubber.

17. The process of preparing a low viscosity cement which comprises plasticizing rubber, adding thereto with mixing a "desolvat- "ing" agent until a soft dough is formed and then gradually adding thereto with mixing a rubber solvent until the mass attains a consistency which allows it to flow freely and spread smoothly.

18. The process of preparing a low viscosity cement which comprises plasticizing rubber, adding thereto with mixing ethyl alcohol until a soft dough is formed and then gradually adding thereto with mixing a rubber solvent until the mass attains a consistency which allows it to flow freely and spread smoothly.

19. The process of preparing a low viscosity cement which comprises plasticizing rubber, adding thereto with mixing ethyl alcohol until a soft dough is formed and then gradually adding thereto with mixing naphtha until the mass attains a consistency which allows it to flow freely and spread smoothly.

20. A process of preparing a low viscosity substantially non-aqueous rubber cement which comprises plasticizing rubber, incorporating therewith with mixing a "desolvating" agent until the rubber reaches a condition whereby it will readily disperse in a rubber solvent, then adding with mixing a rubber solvent until the mass attains a consistency which allows it to flow freely and spread smoothly.

21. A process of preparing a low viscosity substantially non-aqueous rubber cement which comprises plasticizing rubber, incorporating therewith with mixing a "desolvating" agent and an organic solvent-soluble soap until the rubber reaches a condition whereby it will readily disperse in a rubber solvent, then adding with mixing a rubber solvent until the mass attains a consistency which allows it to flow freely and spread smoothly.

Signed at Passaic, county of Passaic, State of New Jersey, this 9th day of July, 1930.

EARDLEY HAZELL.